Dec. 29, 1970 C. S. MILLER 3,551,889

REMOTE SIGNALING OF CONTROL SIGNALS

Filed May 11, 1967 3 Sheets-Sheet 1

WITNESSES

Helen M. Farkas

James T. Young

INVENTOR

Chauncey S. Miller

By M. J. Brodahl

ATTORNEY

United States Patent Office 3,551,889

Patented Dec. 29, 1970

3,551,889

REMOTE SIGNALING OF CONTROL SIGNALS

Chauncey S. Miller, Concord, Mass., assignor to Westinghouse Electric Corporation, Pittsburgh, Pa., a corporation of Pennsylvania Filed May 11, 1967, Ser. No. 637,683
Int. Cl. H04q 9/00
U.S. Cl. 340—171 12 Claims

ABSTRACT OF THE DISCLOSURE

The remote signaling of command signals through operation of a frequency shifted or keyed signal communication system is described for the transmission of binary coded control signal information for application to control the operation of a device such as a railway train. A binary signal ONE is represented by a first frequency $f_1$ and a binary signal ZERO is represented by a second frequency $f_2$. These signal frequencies may be but are not necessarily chosen to have an integral number of cycles during a predetermined signal bit time period or interval $T_s$. The following relationship characterizes this signaling time interval $$T_s=\frac{N_0}{f_0}=\frac{N_1}{f_1}$$

for the case where $N_0$ and $N_1$ are integers, $f_0$ and $f_1$ are measured in cycles/second, and the time interval $T_s$ is measured in seconds. A signal of either frequency $f_0$ or $f_1$ can be made to have either a 0° or a 180° phase angle relationship at the beginning of each signaling interval $T_s$ and with the signal being modulated so the phase thereof is reversed at the beginning of each such time interval.

CROSS REFERENCES TO RELATED APPLICATIONS

The present patent application is related to a copending patent application by C. S. Miller and G. M. Thorne-Booth entitled Signal Transmission to a Remotely Controlled Train, Ser. No. 637,723, filed May 11, 1967 and a copending patent application by G. M. Thorne-Booth entitled Remote Signaling System for Train Control, Ser. No. 637,684, filed May 11, 1967 and now abandoned, which are both assigned to the same assignee as is the present patent application.

BACKGROUND OF THE INVENTION

In the operation of a mass transit oriented train control system, wherein a remote control apparatus is used, train control signals are required between the remote control apparatus and the train and it is desired to effect precise control of one or more individual trains.

The train control signal transmission practice of the prior art has employed more simple on-off coded signals, in that train operation safety has required some modulation of the signal. A constant value train presence control signal is not fail-safe in relation to some equipment failure, which might during a failure condition result in a constant value output signal being provided to indicate safe operation for the train which in truth might not be the actual situation. Therefore, simple on-off modulation of the train presence responsive signal to control the train movement has in the past been utilized.

SUMMARY OF THE PRESENT INVENTION

The present invention however adds to the prior art teachings the further information included in the transmitted signal to additionally transmit train speed control and like information in relation to and between the train and the wayside remote control equipment. This further information included in the signal transmitted to the train in particular is in accordance with a comma free code such that, for example, a six bit word length in such code provides nine comma free control words of information that can be transmitted as commands to the train. Signal receiving equipment carried by the train can identify the desirde command information in a failsafe manner with no separate word synchronization being required and which might be troublesome. Unless the proper command output signal repetition or sequence is identified by the train carried equipment the train will stop its programmed operation.

The control words are transmitted and received in a predetermined manner to assure failsafe operation of the controlled train. In this regard selected ones of first and second frequency signals are provided for each of successive time intervals in accordance with the desired control words, with said frequencies desirably but not necessarily being chosen to have an integral number of cycles during that time interval and with each succeeding interval signal being phase-reversed in relation to the preceding interval signal. The receiver is able to generate a time sequence of control signals to energize a desired output as a function of the desired train command corresponding to the transmitted control word.

In accordance with the teachings of the present invention a fixed signaling block system was considered to be optimum in which the geographic position of each train is defined by its presence in a particular block, with the length of a block being as short as a couple of hundred feet or as long as many thousands of feet.

A wayside transmitter is provided using a crystal controlled oscillator and a series of binary dividers arranged to provide frequency shift keying at a predetermined bit rate which for example could be 18 bits/second and word rate of 3 words/second. The vehicle carries a receiver in the form of a normal FM receiver and discriminator feeding into a shift register of six sections; to provide clocking signals to this shift register in the form of a signal at bit rate obtained by inverting the phase of the transmitter signal at bit intervals if the frequency has not changed at bit intervals, as in a succession of ZEROS or ONES. This bit information is recovered at the receiver and used to generate a bit clock the output of which drives the shift register. Unless signals are received on the vehicle at the correct repetition rate the shift register will stop and no output signals are obtained.

DESCRIPTION OF THE PREFERRED EMBODIMENT

Figure 1:
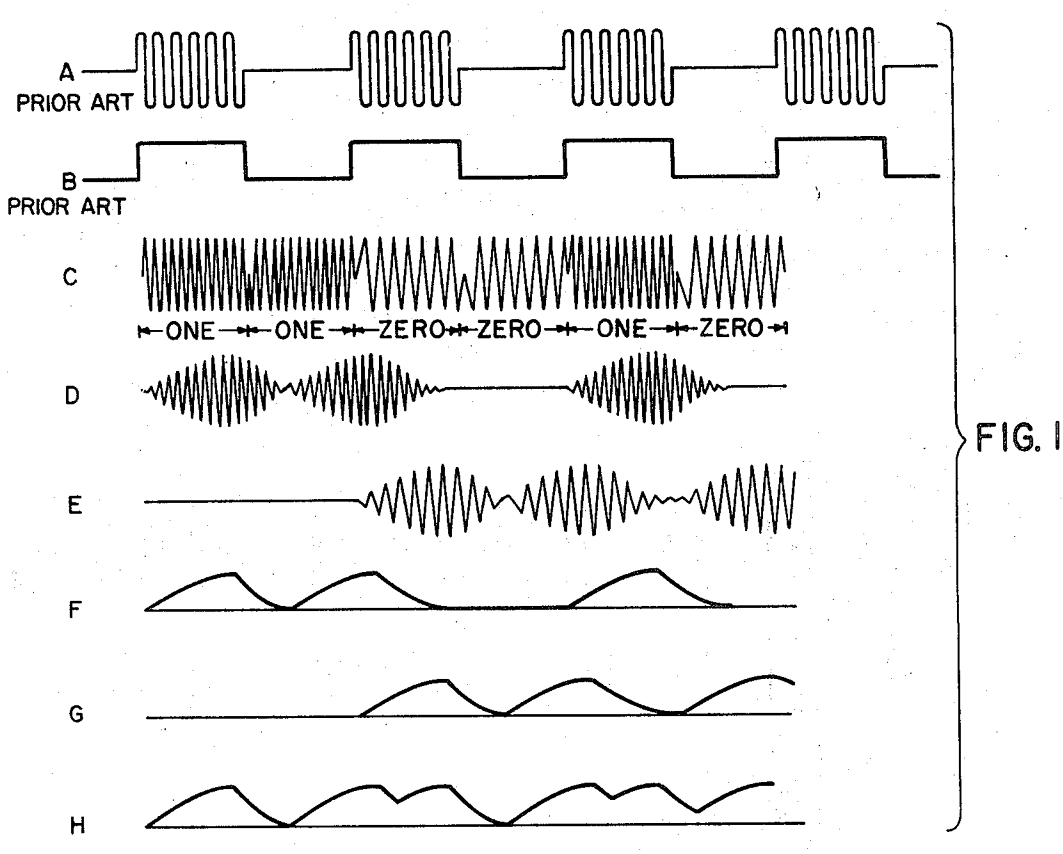
FIG. 1 is a plurality of curves to illustrate in general the signal waveforms involved in accordance with the teachings of the present invention.

In FIG. 1 there is shown a plurality of curves to illustrate in general the signal waveforms involved in the present data communication system which requires no additional synchronization information. In addition the communication system is simple, economical and provides a failsafe performance. The system employs a form of modulation for the communication of binary data; this could be frequency modulation, phase modulation or even amplitude modulation as may be desired for the particular application contemplated. In FIG. 1A there is shown the prior art signal transmission waveform wherein a signal is modulated in a simple on-off manner such that an output waveform as shown in FIG. 1B is obtainable when passed through a suitable detector circuit. The present invention represents a substantial improvement over the prior art signal transmission and is shown by FIG. 1C wherein frequency shift modulation of a carrier wave is effected such that a binary ONE is represented by a frequency $f_1$ and a binary ZERO is represented by a second and different frequency $f_0$. These frequencies can be chosen for example so that there are an integral number of cycles during the signaling interval or bit period $T_s$ and such that the following relationship exists $$T_s=\frac{N_0}{f_0}=\frac{N_1}{f_1}$$

where $N_0$ and $N_1$ are integers, $f_0$ and $f_1$ are measured in cycles/second, and $T_s$ is measured in seconds. With this choice of parameter a signal of either frequency can be made to have either a 0° or a 180° phase angle at the beginning of each signaling interval $T_s$. In addition to the frequency shift corresponding to the binary information modulation, the signal is modulated so that the phase is reversed at the beginning of each signaling interval $T_s$ such that the initial phase of the signal at the beginning of succeeding signal intervals differs by 180° if a succession of ONE's or a succession of ZERO's is transmitted.

Figure 2:
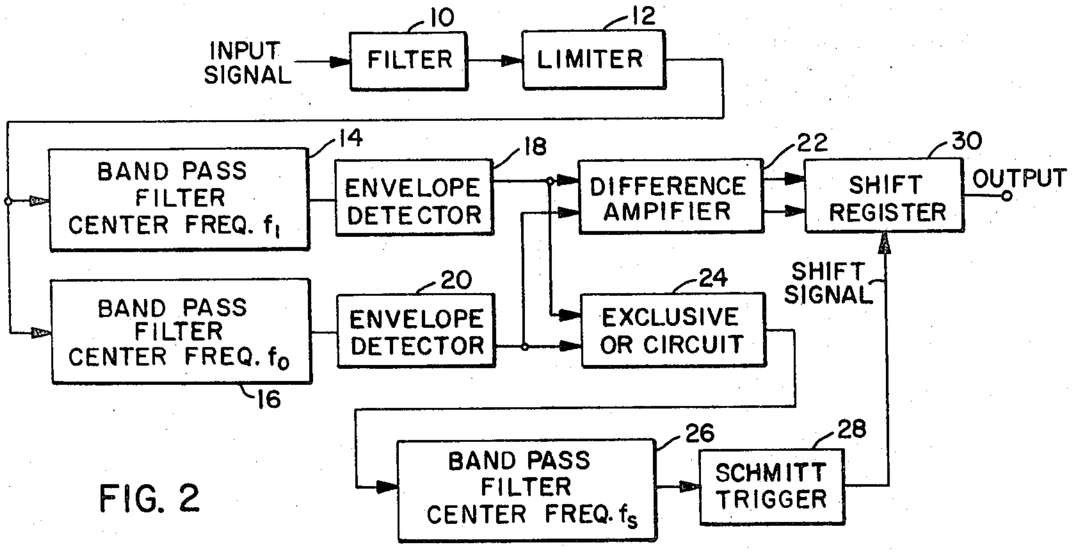
FIG. 2 is a schematic showing of the signal receiver suitable to decode the signal shown in FIG. 1.

The signal shown in FIG. 1C is the command signal received at the remote location such as by the receiver shown in FIG. 2 and carried by a train vehicle. This signal, which may have previously been demodulated if a higher frequency carrier was involved, is applied to a received filter 10 for removing noise or interference at frequencies outside the bandwidth of interest. After being filtered it is then passed through a limiter 12 which provides an output of constant amplitude. This constant amplitude signal, similar to that shown in FIG. 1C is now applied to each of two parallel narrow bandpass filters 14 and 16 having approximately equal bandwidths, one filter 14 having a center frequency $f_1$ and the other filter 16 having a center frequency $f_0$. The output signal from the filter 14 having a center frequency $f_1$ is generally shown in FIG. 1D and the output signal from the filter 16 having the center frequency $f_0$ is generally shown in FIG. 16 for the command word signal waveform shown in FIG. 1C. Since the bandpass filters 14 and 16 have equal bandwidths the envelope in each case will have the general form as shown by waveforms 1D and 1E. The FIG. 1D signal is now applied to an envelope detector circuit 18 to provide the FIG. 1F signal and the FIG. 1E signal is applied to an envelope detector circuit 20 to provide the FIG. 1G signal. The necking down which occurs when successive ONE's or ZERO's are received is caused by the signal phase reversals. The signals shown in FIGS. 1F and 1G are now applied to a difference amplifier 22 which provides a ONE output if the detected signal from the filter 14 tuned to $f_1$ is greater than the detected signal from the filter 16 tuned to $f_0$ and provides a ZERO output if the reverse situation occurs. Since the ONE or ZERO indication depends upon the relative amplitudes of the detected signals and not the actual value, a maximum likelihood of the correct signal detection is achieved. Since the difference amplifier 22 is symmetric, complemented logic levels are available for the inputs to the shift register 30. The outputs of the two envelope detectors 18 and 20 are applied to an exclusive OR circuit 24 which provides the shift register controlling signal shown in FIG. 1H and which signal follows the larger of the two signals from the envelope detectors. Therefore improper signals occurring near the unused frequency are suppressed by the exclusive OR action. The exclusive OR circuit output signal waveform is periodic, having a component of bit rate period $T_s$. Regardless of the sequence of ONE's and ZERO's a frequency component at $f_s$ is always present. The output of the exclusive OR circuit is passed through a narrow bandpass filter 26 with center frequency $$f_s=\frac{1}{T_s}$$

the Schmitt trigger circuit 28 following the filter 26 converts the sinewave at the filter output to a squarewave suitable for driving the shift line of the shift register 30. After the binary information has been inserted into the shift register 30, it is in a convenient form for further decoding or processing.

The delay through the narrow bandpass filter 26 and Schmitt trigger circuit 28 can be made such that the ONE or ZERO indication from the difference amplifier 22 is shifted into the shift register 30 at the optimum moment of the signaling interval $T_s$ when the difference between the envelope detector outputs is maximum.

Figure 3:
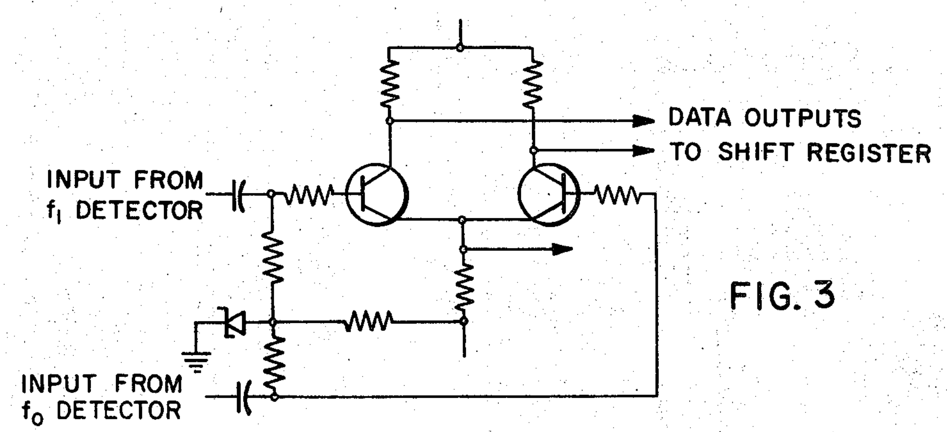
FIG. 3 is a schematic showing of one circuit arrangement to perform the desired difference amplifier and exclusive word function here described.

An advantage of the signal transmission operation illustrated in FIGS. 1 and2 is that since the bandpass filters approximate a matched filter for each bit of the signal described, the receiver provides near optimum performance by rejecting all signals and noise not having the proper characteristics. This may be seen from waves D and E, FIG. 1, which show the time varying characteristic of the outputs of filters 14 and 16. When a signal at the frequency of the tuned filter starts, the amplitude gradually increases from zero and reaches an appreciable amplitude before the end of the bit time interval. When the phase reversal of a consecutive succeeding signal occurs, the amplitude diminishes to a minimum and then starts to increase anew reaching an appreciable amplitude before the end of the bit time interval. By means of an amplitude limiter and the method of determining whether a ONE or ZERO was sent based upon the relative amplitude of the outputs of the two bandpass filters 14 and 16, the communication system is not sensitive to variations in the signal amplitude and therefore requires no adjustment regardless of the input signal strengths or the signal to noise ratio. Further the difference amplifier and the exclusive OR functions can be accomplished if desired with a single circuit to provide greater simplicity and economy, as shown in FIG. 3.

Because of the response delays associated with the bandpass filters in this system, momentary random interruptions of the signal, as may commonly occur in a railway application, will have no adverse or harmful effect on the operation. Should an interruption persist, however, the ringing of the circuits will eventually die away, thereby indicating a major description. The similar delay in initially energizing the system is also of no adverse consequence for continuous operation.

As shown by FIG. 1, curve 1C, the output of the transmitter is modulated by a sequence of binary signals, ONE's and ZERO's, with the coding for example being so constructed that there are available nine unique codes corresponding to the desired nine commands which can be demodulated on the head-end car without the necessity of word synchronization. For this example, consider the following nine comma-free words obtainable from a 6 bit code and the nine speeds allocated to them.

| | M.p.h. |
|---|---|
| 101111 | 80 |
| 100111 | 70 |
| 101110 | 50 |
| 100011 | 34 |
| 100101 | 27 |
| 101001 | 18 |
| 101000 | 17 |
| 100001 | 6 |
| 100000 | 0 |

In order to command the train to move at 18 m.p.h., the following modulation would be impressed on the track circuit transmitter:

. . 011010011010011010011010011010100 . .

To obtain 12 m.p.h., the following:

. . 101000101000101000101000101000 . .

To obtain 0 m.p.h., the following:

. . 00100000100000100000010000

The characteristics of the utilized code are such that a change from one speed to another cannot give rise to even a transient error, as seen:

. . 01 101001 101001 101001 100101 10 . .
18 18 18 27

To decode this series of ONE's and ZERO's, nine sets of gates are fitted on the train with one set being activated by the 101111 command signal (80 m.p.h.), another by the 100111 command signal (70 m.p.h.), a third by the 100011 command signal (34 m.p.h.) and so on. Examining the series of bits shown above, we see that we have in succeeding periods of time the following:

011010—all 9 sets of gates give zero output
110100—all zero
101001—18 m.p.h. lights up, other zero
010011—all zero
100110—all zero
001101—all zero
011010—all zero
110100—all zero
101001—18 m.p.h. lights up, others zero
010011—all zero
100110—all zero
001101—all zero
011010—all zero
110100—all zero
101001—18 m.p.h. lights, others zero
010011—all zero
100110—all zero
001100—all zero
011001—all zero
110010—all zero
100101—27 mp.h. lights up, others zero
001011—all zero
010110—all zero
101100—all zero
011001—all zero
110010—all zero
100101—27 m.p.h. lights up, others zero
001011—all zero . . . etc.

The gate outputs are thus either zero, or a series of pulses of 1 to 5 mark-space ratio. The desired command is thus defined by the set of gates giving this recognizable outputs; changing the command from one speed to another produces no incorrect output train control signals.

The output of the addressed set of gates, being a recognizable series of pulses at an accurately defined rate, can be A-C coupled and appropriately filtered, thus ensuring fail-safe operation on the train. The fail-safe criteria are identical to those long accepted as adequate for this train signaling application.

As an example of a practical train control application, consider two steel rail track circuits in close proximity, with several spaced frequency transmitters provided to energize the respective track blocks operative with associated receivers to determine track occupancy. Suppose that the two track circuits are radiating the following 6-bit code as above set forth:

circuit A . . 1010011010011010011 . .

circuit B . . 1101001101001101001 . .

The train, in passing from one track circuit to the next, decodes either as 18 m.p.h.: however, the receiver associated with track circuit A would indicate an incorrect code if, by equipment failure, it received the time-shifted transmission from track circuit B. Indication of unoccupied track is only given by reception at the receiver of the identical carrier for the associated transmitter, and also bit-by-bit agreement of the modulation. Since there can be provided three different carrier frequencies and six time shifted versions of the same comma free code for each frequency, as many as eighteen orthogonal channels are available. This allows very wide separation of track circuits carrying identical carriers and identical modulation.

The present remote signaling system is intended for use with track circuit apparatus using serial coding to provide an integrated system suitable for both train presence detection and train control. The track can be short circuited at block intervals, with audio frequency power being introduced into the track at the points of the short circuits. The maximum length of a block is on the order of 2000 feet. Antennas acting as current sensors are fitted on the head end cars of the train and on the track short circuits. Frequency shift modulation is employed to carry the train speed control signals from a wayside transmitter provided for each block of track to a train carried receiver with the above described 6-bit serial comma free code being used to convey the train control signals and thereby allowing nine speed commands to be transmitted over the track circuit communication channel. The signal transmitter can comprise a simple amplifier and digital drive stage followed by a class D push-pull switching stage driving a band pass filter. This filter is designed to reduce the odd harmonics of the squarewave to a level low enough to meet FCC requirements, to provide an impedance match, and to supply considerable attenuation of the induced effect of any unbalanced traction currents back from the loop to the transmitter.

Figure 4:
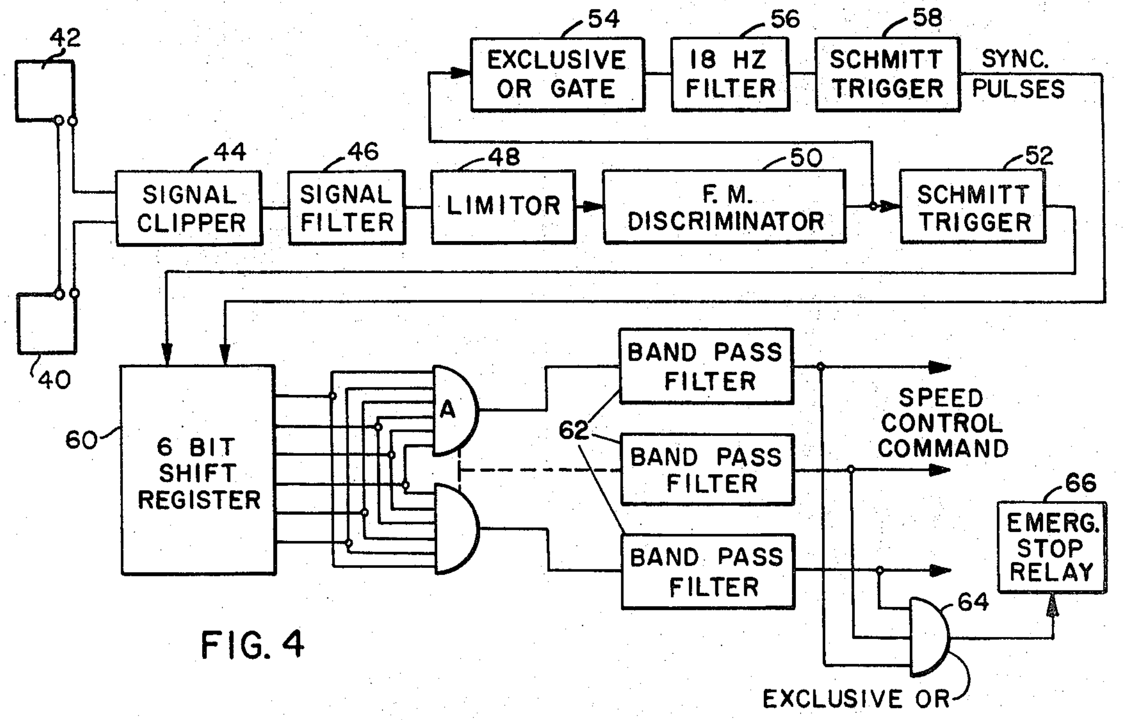
FIG. 4 is a block diagram of the signal receiver to show in particular one logic gate arrangement utilized to decode command word signals.

As shown in FIG. 4, the train carried receiver receives the signals from the two antennas 40 and 42 at the head end of the train vehicle, which signals are added in such a direction that any noise cancels but the wanted command signals add. A transient signal clipper 44 reduces the energy of noise transients. The signals are passed to a signal filter 46 consisting of six of the standard chosen frequency crystal filters then to a threshold circuit and a limiter 48; these signals in one practical embodiment were chosen to be at the frequency of 9.72 kilocycles, 8.64 kilocycles, 7.776 kilocycles, 6.48 kilocycles, 5.76 kilocycles and 5.184 kilocycles and therefore appear at the output of the limiter 48 if they were strong enough to pass the threshold circuit. However only the strongest of these signals will in practice appear, this being a conventional frequency modulation characteristic. The signal from the limiter is now detected in a non-linear FM discriminator 50 in which frequencies of 9.72, 8.64 or 7.776 kilocycles give a positive output and signal frequencies of 6.48, 5.76 or 5.184 kilocycles give a negative output.

The output from the discriminator 50 is therefore the required serial code and it is passed to a Schmitt trigger circuit 52 to give a definite threshold requiring the output to change from a positive to a negative voltage or vice versa for the Schmitt trigger circuit 52 to change its state. The discriminator output is also passed to an exclusive OR circuit 54 which extracts the bit rate information. The bit rate pulses are then passed through an 18 cycle/second bandpass filter 56, 0.5 cycle/second wide, designed to give an appropriate delay and then to a Schmitt trigger circuit 58. The two output signals are thus the signal in serial code and the clock pulses occurring as desired just before the bit change.

The clock pulses and bit signals are then passed to a six bit shift register 60, the output of which is coupled to a series of up to nine AND gates, with one such AND gate being provided for each desired speed command to the train vehicle. The output of the addressed AND gate is thus a series of pulses three per second of mark-space ratio 1 to 5, while the output of all the other AND gates are zero. These outputs are passed through individual bandpass filters 62 and then to a failsafe exclusive OR gate 64. One and only one of the words must be present at all times to hold off the emergency stop relay 66 which is driven from this exclusive OR gate. The filtered signals are thus digital commands used for speed control of the train through operation of the circuitry shown in FIG. 4.

Figure 5:
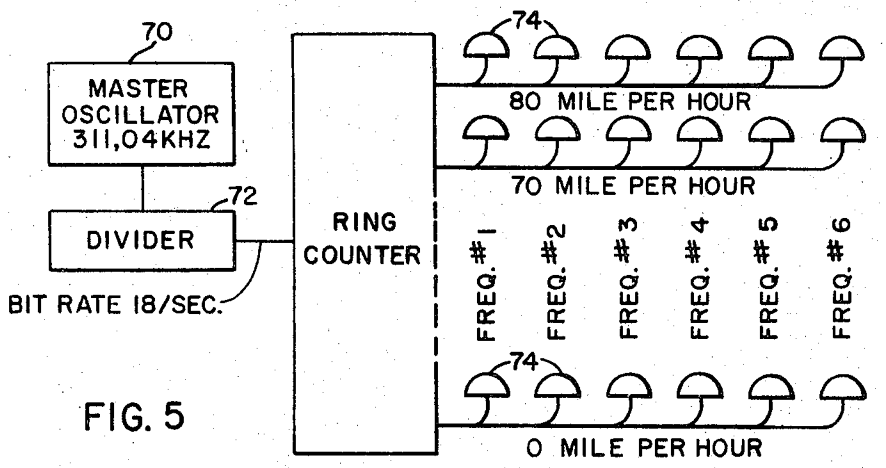
FIG. 5 illustrates a signal encoder including a plurality of OR gates with a six stage ring counter.
Figure 6:
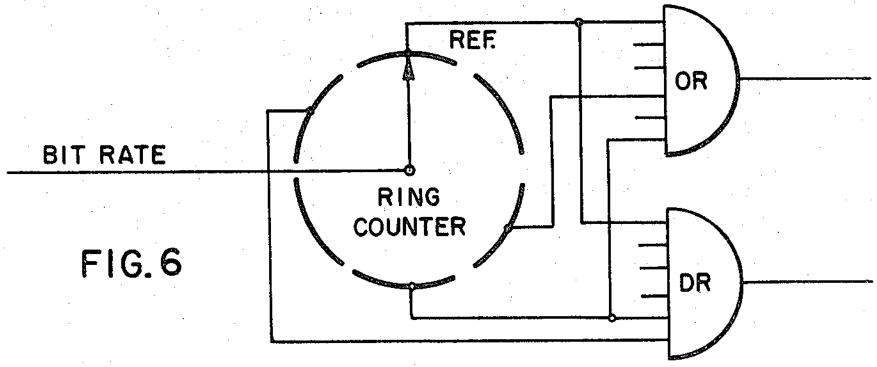
FIG. 6 shows a gate arrangement to generate a typical command word with phase shifts of 0 and 3 bits respectively.
Figure 7:
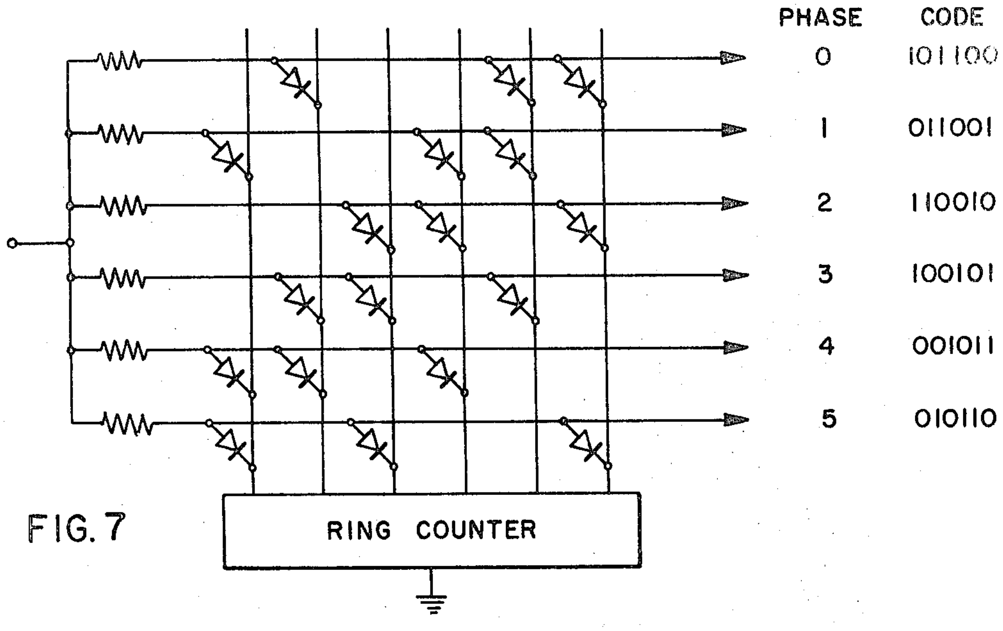
FIG. 7 shows a more general diode matrix to generate all six shifts of the command word code.

The nine speed commands which are sent from wayside transmitters to the train are 80 m.p.h., 70 m.p.h., 50 m.p.h., 34 m.p.h., 27 m.p.h., 18 m.p.h., 12 m.p.h., 6 m.p.h., and 0 m.p.h. Each of these commands in the example here illustrated is encoded into a six-bit comma free code for transmission to the train with a phase shift of 0 to 5 bits. This encoding is accomplished by means of OR gates connected to a common six-stage ring counter as shown in FIG. 5. The output of the master oscillator 70 is divided down by divider 72 to a frequency of 18 cycles/second which is also the multiplex word rate. Each bit pulse advances the ring counter one step forward thus generating a bit or no-bit for that particular bit time at the output of each of the OR gates 74 depending on their individual connections. A total of 54 OR gates is required with a maximum of 5 inputs per gate to perform this function. FIG. 6 shows a ring counter operation with OR gates to generate the code 101100 with phase shifts of 0 and 3 bits respectively. In FIG. 7 there is shown as a general example a more general diode matrix for generating six shifts of code signal 101100.

What I claim is:

1. In signal transmission apparatus for controlling a device:

(a) signal means for providing successive first and second signals, with said first signal having a first frequency and with said second signal having a second frequency and such that each of said signals is provided for substantially the same signal time interval, (b) said first frequency being different than said second frequency, (c) each of said signals having a predetermined one of a 0° or a 180° phase angle at the beginning of said signal time interval and such that the phase of at least succeeding repetitive signals is reversed at the beginning of each such signal time interval relative to the preceding signal, (d-1) first filter means tuned to said first frequency and operative to derive from each said signal time interval occupied by said first signal one control pulse having a predetermined time varying amplitude characteristic, (d-2) second filter means tuned to said second frequency and operative to derive from each said signal time interval occupied by the second frequency another control pulse also having said predetermined time varying amplitude characteristic, (d-3) means cooperative with the time varying amplitude characteristic of each control pulse for providing a rate of occurrence of control pulse signal, (e) and control means operative to control said device in a predetermined manner in accordance with the occurrence of a predetermined time sequential group of said one and another control pulse in predetermined timed relationship to said rate of occurrence of control pulse signal.

2. The signal transmission apparatus of claim 1, including:

(f) said control means including signal storage means and said means for providing a rate of occurrence of control pulse signal being operative with said signal storage means to determine the storage of a predetermined plurality of said control pulses relative to the time rate occurrence of said control pulses for the purpose of providing a desired command signal for said device.

3. The signal transmission apparatus of claim 1, including:

(g) each of said filter means being a bandpass filter operative approximately as a matched filter for said signal time interval occupied by a signal having the frequency to which the filter means is tuned.

4. The signal transmission apparatus of claim 1, including:

(h) each of said filter means being a bandpass filter having a bandwidth characteristic cooperative with said signal time interval to provide a predetermined time varying amplitude characteristic which increases in a desired manner before the end of the signal interval.

5. The signal transmission apparatus of claim 4, including:

(i) signal limiter means operative to receive said first and second signals and to deliver to the first and second filter means signals of substantially constant amplitude.

6. The signal transmission apparatus of claim 1, including:

(j) said signal means providing said first and second signals as a serial signal in which the first and second signals are sequential components of the same signal wave, (k) said first and second filter means each providing the control pulses as separate signal waves comprising, respectively, a signal train of the one control pulses and a signal train of the another control pulses, and (l) said means for providing a rate of occurrence of control pulse signal being operative to provide a signal wave comprising a signal train which is a combination of both the one and the another signal pulses.

7. In a communication system in which information is transmitted in the form of a sequential group of binary digit signals, the combination;

(a) signal means for providing a serial binary code signal having a predetermined bit interval and comprising successive bits of one or another of a first digit signal having a first frequency and a second digit signal having a second different frequency, said code signal further having a sequence pattern such that at least each succeeding consecutive digit signal is reversed at the beginning of each bit interval relative to the preceding signal, (b) first means operative to derive a one digit pulse from each bit interval occupied by said one digit signal, said one digit pulse having a predetermined time varying amplitude characteristic, (c) second means operative to derive an another digit pulse from each bit interval occupied by said another digit signal, said another digit pulse also having said predetermined time varying amplitude characteristic, (d) signal receiving means including a binary signal shift register operative to store said one and said another digit pulses as one and the another binary digits in said shift register and operative to time the acceptance of an input digit pulse and the shifting of binary digits in accordance with the rate of combined occurrence of said one and said another digit pulses, and (e) sequential group recognition means for sensing the presence of a desired group of binary digits stored in said shift register.

8. The communication system of claim 7, including:

(f) each of said first and second means being a bandpass filter operative approximately as a matched filter for said bit interval occupied by a signal having the frequency of the corresponding digit signal.

9. The communication system of claim 7, including:

(g) each of first and second means being a bandpass filter having a bandwidth characteristic cooperative with said bit interval to provide a time varying amplitude characteristic which increases in a desired manner before the end of the bit interval.

10. The communication system in accordance with claim 7, including:

(h) said signal receiving means being operative to accept and shift digit pulses in a predetermined timed relationship to the rate of combined occurrence of said one and said another digit pulses such that the digit pulses are received near the end of bit intervals.

11. The communication system of claim 7, including:

(i) said bit interval and said first and second frequency cooperative such that:

$$T_b=\frac{N_0}{f_0}=\frac{N_1}{f_1}$$

where:

$T_b$ is the bit interval, $f_0$ and $f_1$ are the first and second frequencies, and $N_0$ and $N_1$ are integers.

12. The communication system in accordance with claim 7, including:

(j) said shift register being operative to accept and store said one and said another digit pulses as first and second signal levels, said signal levels defining a complementary pair of logic levels, (k) said receiving means including means for converting the one digit pulses and the another digit pulses to said first and second signal levels for delivery to the shift register.

References Cited

UNITED STATES PATENTS

| | | | |
|---|---|---|---|
| 3,069,657 | 12/1962 | Green et al. | 340—171 |
| 3,341,782 | 9/1967 | Aemmes | 325—320X |
| 3,430,143 | 2/1969 | Walker et al. | 325—320X |
| 3,445,593 | 5/1969 | Gray et al. | 340—170X |

DONALD J. YUSKO, Primary Examiner

U.S. Cl. X.R.

325—320